(12) United States Patent
Bruegeman

(10) Patent No.: US 7,891,908 B2
(45) Date of Patent: Feb. 22, 2011

(54) PIPE EXTRACTING TOOL

(76) Inventor: Dale Bruegeman, 1740 NE. 92nd, Seattle, WA (US) 98115

( * ) Notice: Subject to any disclaimer, the term of this patent is extended or adjusted under 35 U.S.C. 154(b) by 62 days.

(21) Appl. No.: 12/108,343

(22) Filed: Apr. 23, 2008

(65) Prior Publication Data

US 2009/0269142 A1      Oct. 29, 2009

(51) Int. Cl.
*F16L 55/44* (2006.01)
*F16L 55/18* (2006.01)

(52) U.S. Cl. .................. 405/184.3; 285/15; 138/178; 29/770

(58) Field of Classification Search ........... 405/184.1, 405/184.3; 30/105, 106; 285/15; 138/97, 138/178; 29/770
See application file for complete search history.

(56) References Cited

U.S. PATENT DOCUMENTS

| | | | |
|---|---|---|---|
| 1,834,071 A | 12/1931 | Reed | |
| 2,376,858 A | 5/1945 | Barrans | |
| 2,860,408 A | 11/1958 | Woyton | |
| 3,005,314 A | 10/1961 | Cunningham | |
| 3,021,122 A * | 2/1962 | Maxon, Jr. | 366/45 |
| 3,176,384 A | 4/1965 | Johnson | |
| 3,770,301 A * | 11/1973 | Adams | 285/15 |
| 4,219,050 A * | 8/1980 | Hargrave et al. | 138/97 |
| 5,222,769 A * | 6/1993 | Kaempen | 285/45 |
| 6,634,074 B2 * | 10/2003 | Wild | 29/402.18 |
| 2005/0242571 A1 * | 11/2005 | Houghton et al. | 285/110 |

OTHER PUBLICATIONS

International Search Report and Wriiten Opinion dated Jun. 17, 2009, issued in corresponding PCT/US2009/041429, filed Apr. 22, 2009.

* cited by examiner

*Primary Examiner*—David J Bagnell
*Assistant Examiner*—Benjamin Fiorello
(74) *Attorney, Agent, or Firm*—Christensen O'Connor Johnson Kindness PLLC

(57) ABSTRACT

A pipe extracting tool for use with first and second pipes mated together and having a gasket disposed therebetween includes an arcuate blade and a driving member portion extending radially outwardly from the arcuate blade. The arcuate blade is sized and shaped to surround an outer circumference of the first pipe and slide between the outer circumference of the first pipe and an inner circumference of the second pipe to disengage the gasket from one of the first and second pipes.

6 Claims, 4 Drawing Sheets

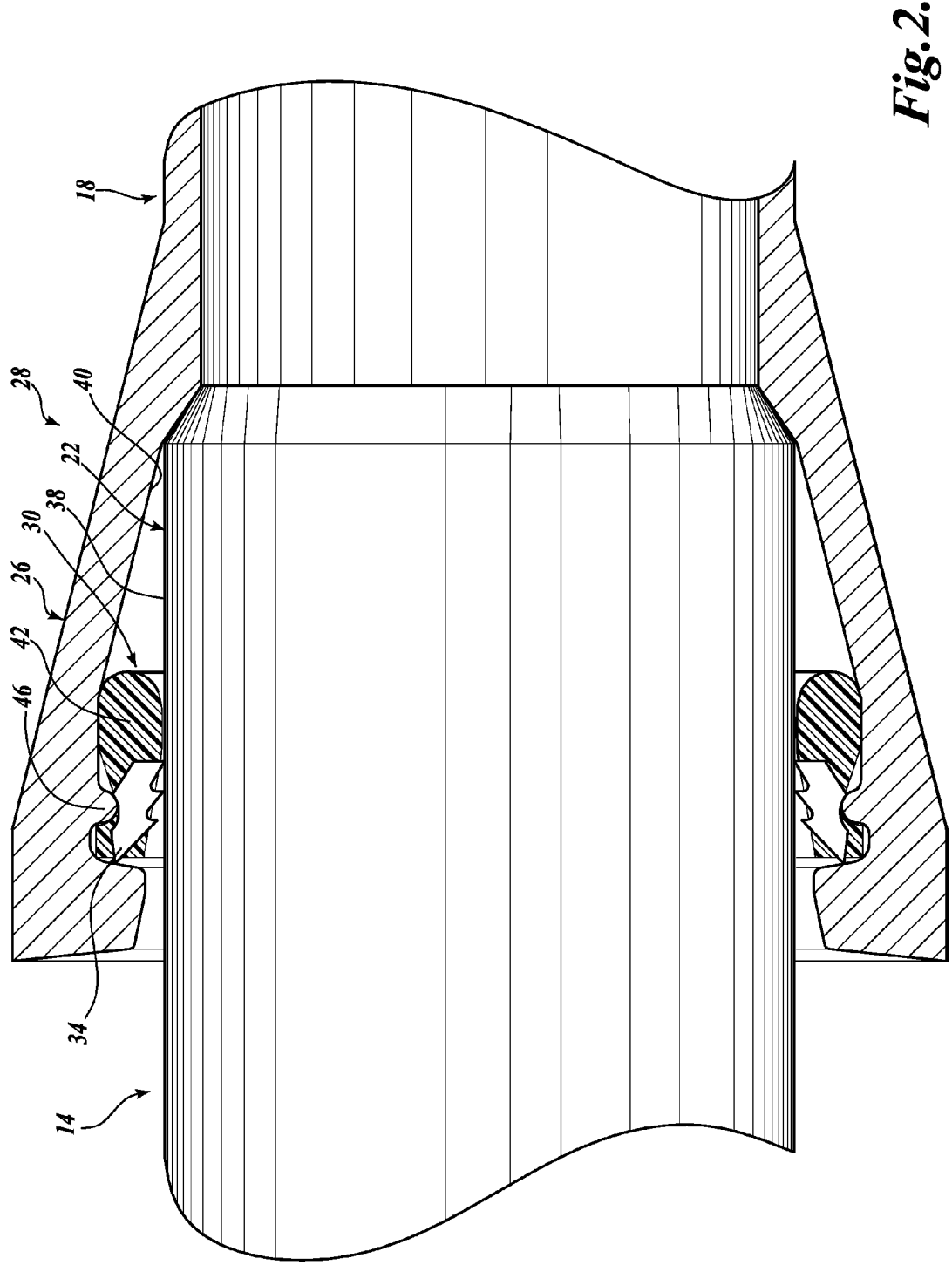

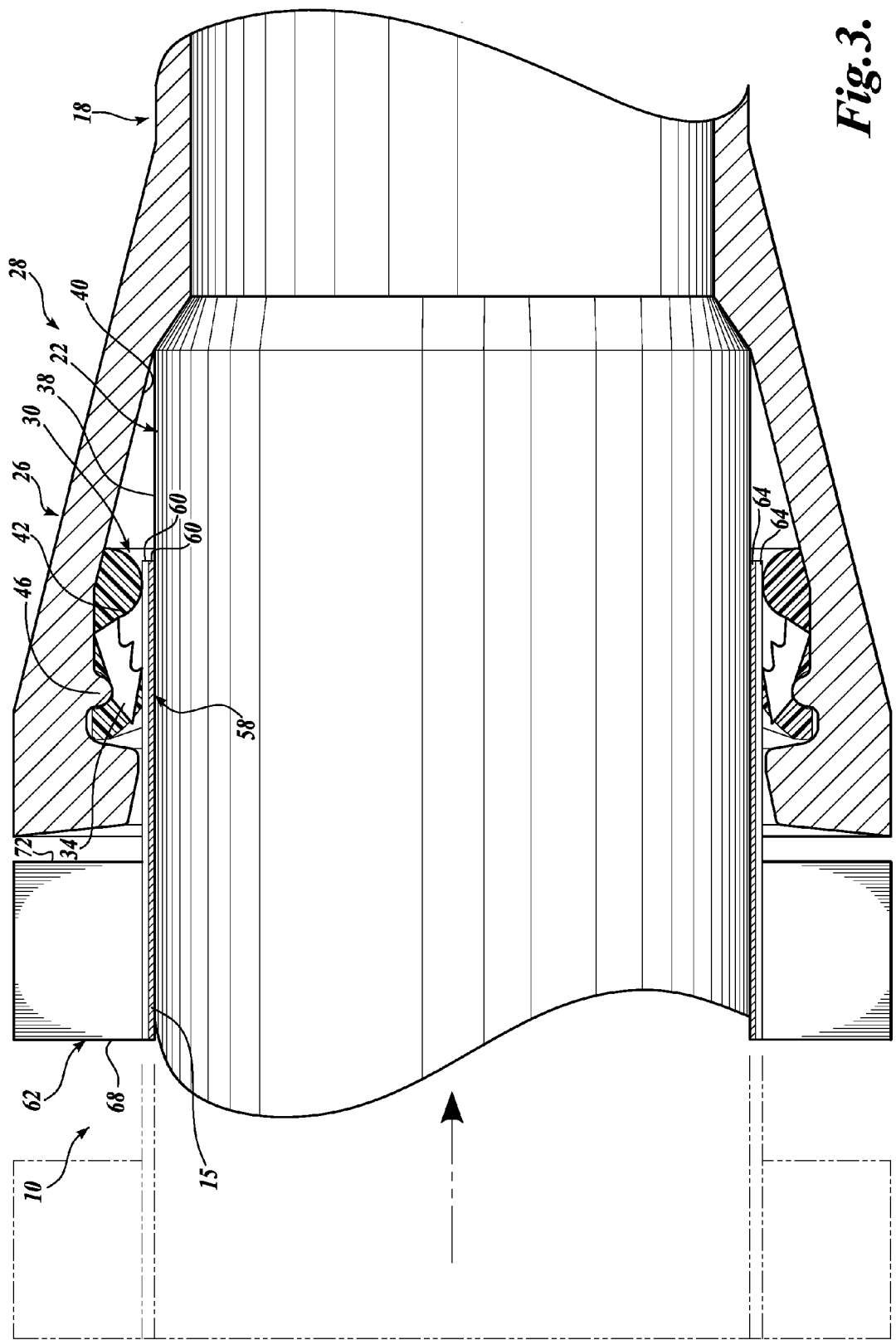

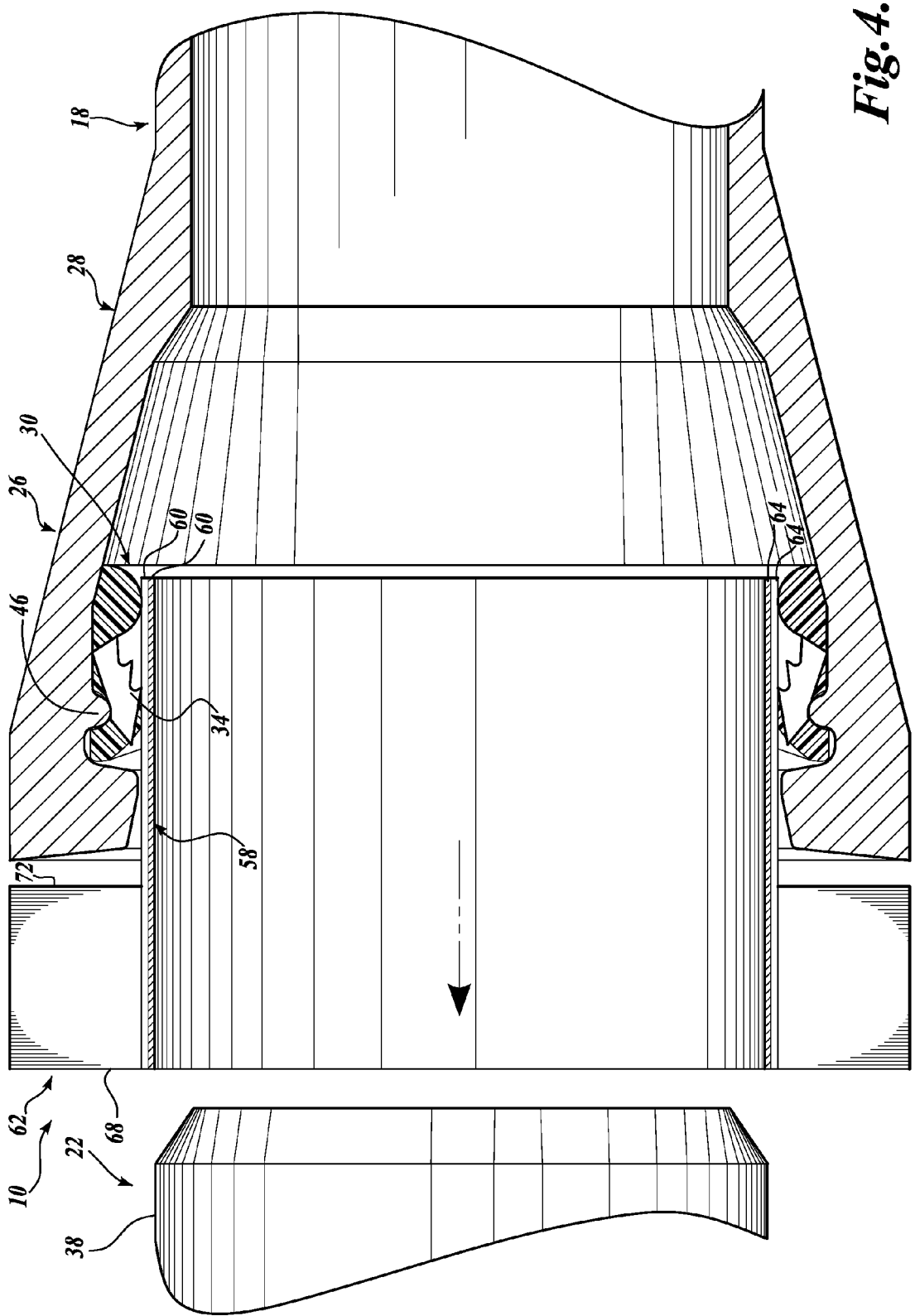

PIPE EXTRACTING TOOL

BACKGROUND

In many situations where pipes are joined in a telescoping relationship, the cylindrical or spigot end of a first pipe is inserted into a flared or bell end of a second enclosing pipe to define a pipe joint. The flared end has an opening with a diameter large enough to receive the straight end of the first pipe. A gasket made from rubber or another elastomeric material is typically inserted into the flared end of the enclosing pipe and prevents leakage of fluids from the pipe joint by forming a seal between the two pipes.

In applications where fluid flowing within the pipes is under high pressure, various means may be employed to prevent the pipes from separating. For instance, the gasket may include toothed metal segments that are spaced around the inner perimeter of the gasket. The metal segments pivot about a bead formed on the inner surface of the second pipe to allow the straight end of the first pipe to be further inserted into the flared end of the second pipe. However, pulling the first pipe out of the flared end causes the toothed segments to engage the outer surface of the first pipe to prevent withdrawal of the first pipe.

Although the toothed metal segments are effective in preventing the pipes from separating under high pressure conditions, the joined pipes cannot be easily separated for maintenance, repair, etc. A common way to separate the pipes is to cut the pipes at the joint. However, this requires replacing a portion of the pipes or retrofitting the pipes with a new pipe joint assembly. Another method used to separate the pipes includes using a plurality of metal shims to separate the pipes. To separate the pipes, a shim must be slid between the two pipes at each toothed metal segment location to disengage the teeth from the outer surface of the first pipe. The pipes are thereafter pulled apart. This process is labor intensive because it requires locating each toothed metal segment and forcible inserting the shim between the two pipes.

Given these problems, it is desirous to have a tool for separating joined pipes in an easy, efficient manner, and that does not require cutting the pipes.

SUMMARY

The present application discloses a pipe extracting tool for use with first and second pipes mated together and having a gasket disposed therebetween. The pipe extracting tool includes an arcuate blade and a driving member portion extending radially outwardly from the arcuate blade. The arcuate blade is sized and shaped to substantially surround an outer circumference of the first pipe and slide between the outer circumference of the first pipe and an inner circumference of the second pipe to disengage the gasket from one of the first and second pipes.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein:

FIG. 2 is a cross sectional view of a pipe assembly having a first pipe received within a second pipe and a gasket disposed therebetween;

FIG. 3 is a cross sectional view of the pipe assembly of FIG. 2, wherein a pipe extracting tool is received between the first and second pipes such that the gasket is disengaged from the first pipe; and FIG. 4 is a cross sectional view of the pipe assembly of FIG. 2, wherein a pipe extracting tool is received between the first and second pipes and the first pipe is being removed from within the second pipe.

DETAILED DESCRIPTION

Figure 1:
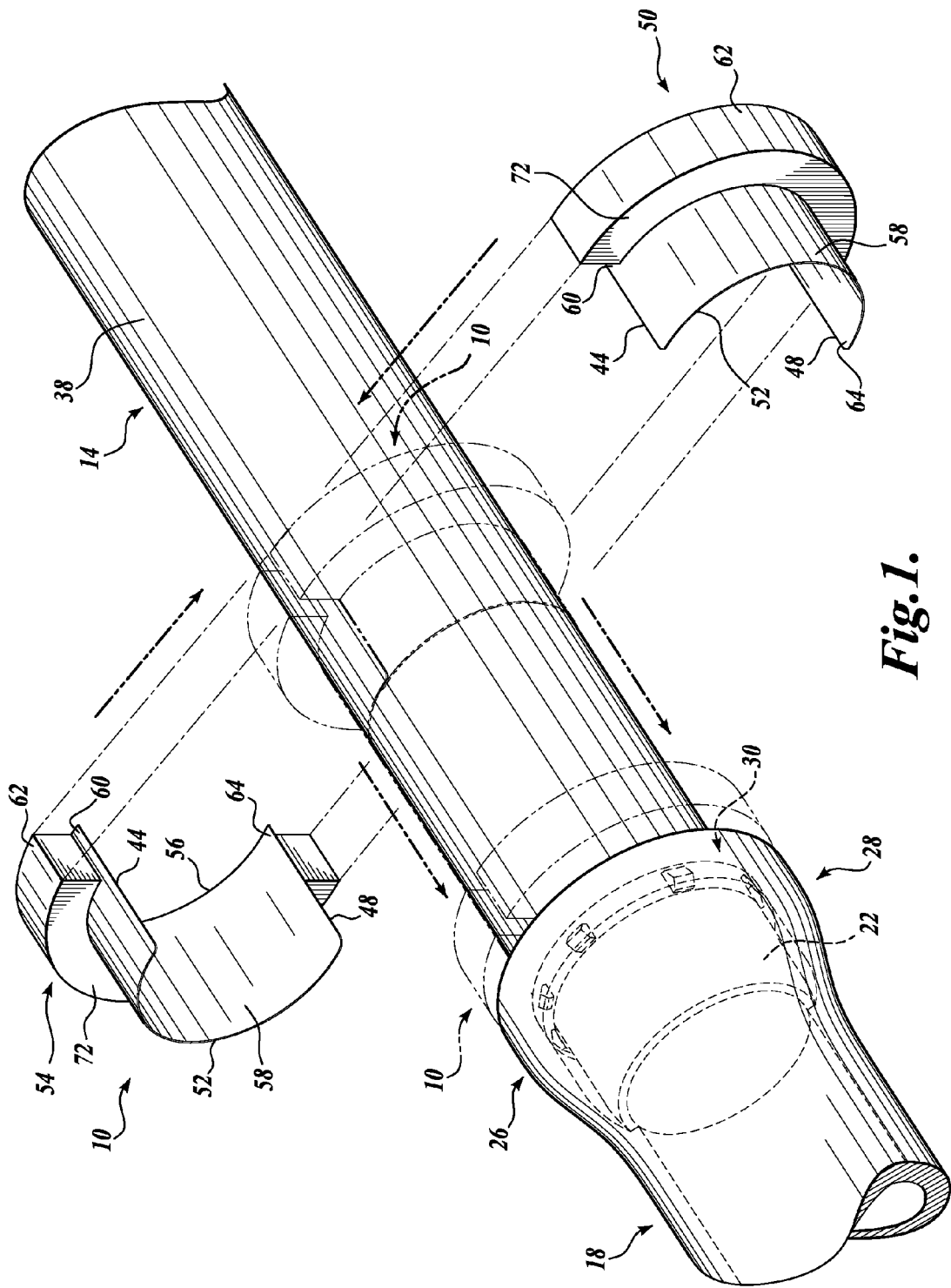
FIG. 1 is an environmental view of a pipe extracting tool constructed in accordance with one embodiment of the disclosed technology, wherein the pipe extracting tool is being used to disassembly a pipe assembly.

A pipe extracting tool 10 constructed in accordance with one embodiment of the disclosed technology is best seen by referring to FIG. 1. The pipe extracting tool 10 is used to disassemble a pipe assembly having a first pipe 14 that has been fitted into a flared end of a second pipe 18. Although the pipe extracting tool 10 may be used with any suitable pipe assembly, the first pipe 14 of the pipe assembly preferably includes a cylindrical end 22 that is received within a flared end 26 of the second pipe 18 to define a pipe joint 28. The first and second pipes 14 and 18 may be made of any suitable material and may be adapted for use with any suitable application. For instance, the pipe extracting tool 10 may be used to disassemble a ductile iron pipe assembly used to transport fluids. A typical ductile iron pipe assembly includes a rubber or elastomeric gasket 30 compressed between the flared end 26 of the second pipe 18 and the cylindrical end 22 of the first pipe 14. The gasket 30 prevents leakage of fluid from the pipe joint 28 by forming a seal between the pipes 14 and 18.

The gasket 30 also prevents withdrawal of the first pipe 14 from within the second pipe 18. The gasket 30 includes a plurality of toothed metal or other rigid segments 34 spaced uniformly or non-uniformly around the inner perimeter of the gasket 30. Each segment 34 has a number of sloped teeth that are angled away from the flared, open end of the second pipe. To assemble the pipes 14 and 18, the cylindrical end 22 of the first pipe 14 is moved into the flared, open end 26 of the second pipe 18. An outer circumference and surface 38 of the first pipe 22 rides against the teeth of the metal segments 34 and pivots the metal segments 34 about a bead 46 formed on the inner circumference and surface 40 of the flared end 26 to allow the cylindrical end 22 of the first pipe to be inserted into the flared end 26. At the same time, the cylindrical end 22 of the first pipe 14 compresses a sealing bulb 42 of the gasket 30 to form a fluid tight seal between the flared end 26 and the outer surface of the cylindrical end 22. Thus, the gasket 30 both forms a seal between the first and second pipes 14 and 18 and prevents withdrawal of the first pipe 14 from within the second pipe 18 under high fluid pressure conditions.

Referring still to FIG. 1, the pipe extracting tool 10 will now be described in detail. In one embodiment, the pipe extracting tool includes a first tool piece 50 and a second tool piece 54; however, it should be appreciated that the pipe extracting tool 10 may instead be formed with only one tool piece, or instead, three or more tool pieces, without departing from the spirit and scope of the disclosed technology. Moreover, the tool pieces 50 and 54 may be separate, as shown, or may instead be hingedly connected or otherwise at least partially joined together in a suitable manner.

The first and second tool pieces 50 and 54 are substantially identical, and therefore only the first tool piece 50 will be described in detail. The first tool piece 50 includes an insertion portion that includes a thin arcuate blade 58 that is secured to the inner circumference of a driving member 62. The blade 58 has a circumferential length defined by first and second long edges 52 and 56 and an axial length defined by first and second short edges 44 and 48. In one embodiment, the arcuate blade 58 is made from metal or any other suitable durable material and is curved to fit around at least a portion of the exterior circumference of the first pipe 14.

The circumferential length of the arcuate blade 58 (i.e., the curved length of the first and second long edges 52 and 56) is preferably at least one half of the circumference of the first pipe 14, or slightly larger. Preferably, the circumferential length of the arcuate blade 58 is slightly larger than one half the circumference of the first pipe 14 such that it defines a first excess portion 60 near the first short edge 44 and a second excess portion 64 near the second short edge 48. The first and second excess portions 60 and 64 lie beneath or on top of the excess portions 60 and 64 of the second tool piece 54 such that they overlap when the first and second tool pieces 50 and 54 surround and engage the first pipe 14.

The arcuate blade 58 is sufficiently thin such that it may be slidably received between the gasket 30 and the exterior surface 38 of the first pipe 14 when the first pipe 14 is received within the second pipe 18, as shown in FIGS. 1 and 3. Preferably, the arcuate blade 58 is sufficiently thin such that the overlapped excess portions 60 and 64 may also slide between the gasket 30 and the first pipe 14. In this manner, the arcuate blade 58 will engage the entire gasket 30 and disengage all the toothed metal segments 34 from the first pipe 14. Moreover, the arcuate blade 58 is sufficiently long, i.e., the first and second short edges 44 and 48 have a sufficient length such that when the arcuate blade 58 is received between the first and second pipes 14 and 18, the leading edge 52 slides completely past the gasket 30.

It should be appreciated that the circumferential length of the arcuate blade 58 may instead be less than one half of the circumference of the first pipe 14 such that the arcuate blades 58 of the first and second tool pieces 50 and 54 do not overlap. Instead, the arcuate blades 58 of the first and second tool pieces 50 and 54 may substantially surround and engage the first pipe 14 such that the first and second short edges 44 and 48 of each arcuate blade 58 are positioned substantially adjacent to one another or a gap is defined therebetween. With the blades 58 arranged on the first pipe 14 such that they are not overlapping, the arcuate blades 58 may have a greater thickness to increase the strength and durability of the blade 58 while still being slidably receivable between the gasket 30 and the first pipe 18.

As indicated above, the first tool piece 50 includes a driving member portion 62 secured to or formed on the outer circumference of the arcuate blade toward the second long edge 56. The driving member portion 62 has a radial thickness that forms a surface that is adapted to receive blows from an object, such as a hammer, to drive the arcuate blade 58 into the pipe joint 28. The driving member portion 62 may be formed of wood or another suitable material and thereafter secured to the arcuate blade 58 with any suitable fastener, such as screws or an adhesive. As an alternative, the driving member portion 62 may be integrally formed with the arcuate blade 58 out of the material used for the arcuate blade 58. For instance, driving member portion 62 may be formed by rolling or folding the rear edge 56 of the arcuate blade 58. As yet another alternative, the driving member portion 62 may be formed separately from a piece of metal and thereafter welded, bonded, or otherwise secured to the arcuate blade 58.

The driving member portion 62 preferably has the same radius of curvature as the outer circumference of the arcuate blade 58 such that the two may be mated together in an easy manner. Moreover, the driving member portion 62 is preferably square or rectangular in cross-section such that it defines a substantially flat upper and lower surface 68 and 72 (see also FIG. 3). As such, a hammer or other suitable tool may be used to deliver a blow to the upper surface 68 to drive the first tool piece 50 into the pipe joint 28.

In one embodiment, the driving member portion 62 has an inner radial circumference that is less than half the outer circumference of the first pipe 14. As such, the driving member portion 62 does not interfere with the excess portions 60 and 64 of the arcuate blade 58, and the excess portions 60 and 64 of adjacent arcuate blades can overlap when the first and second tool pieces 50 and 54 surround the first pipe 14. It should be appreciated that the first tool piece 50, for instance, may instead include a driving member portion 62 that extends along the entire rear edge 56 of the arcuate blade 58. In that case, the second tool piece 54 may include excess portions that are not covered by the driving member portion 62 that may be positioned beneath the arcuate blade 58 of the first tool piece 50 when they are surrounding the first pipe 14.

Referring to FIGS. 1 and 3, the arcuate blade 58 has an axial length that is sufficiently long such that when the arcuate blade 58 is received within the flared end 26 of the second pipe 18, the arcuate blade 58 slides past the gasket 30 and the driving member portion 62 is positioned exterior of or in abutment with the flared end 26 of the second pipe 18.

Referring now to FIGS. 2-4, the manner in which the embodiment of the pipe extracting tool 10 described above is used to separate the first and second pipes 14 and 18 will now be described. First, the pipe joint 28 is preferably inspected to ensure that the cylindrical end 22 of the first pipe 14 is properly aligned and received within the flared end 26 of the second pipe 18. To inspect the pipe 28, any suitable probe may be inserted into the gap defined between the flared end 26 and the cylindrical end 22 to feel the gasket 30 disposed therebetween. The probe may be inserted into the gap at different points around the pipe joint 28 to ensure that the gasket 30 is properly disposed between the cylindrical end 22 and the flared end 26 of the first and second pipes 14 and 18. After ascertaining that the first pipe 14 is substantially "straight," i.e., properly aligned and received within the second pipe 18, any dirt or debris can be cleaned from the gap defined between the flared end 26 and the cylindrical end 22. Thereafter, the arcuate blade 58 of the first and second tool pieces 50 and 54 may be coated with a pipe lube to allow for easy insertion of the arcuate blade 58 into the pipe joint 28.

Still referring to FIG. 1, the first and second tool pieces 50 and 54 are positioned on the exterior surface 38 of the first pipe 14 such that the arcuate blades 58 are directed toward the pipe joint 28. Moreover, if the arcuate blades 58 include excess portions 60 and 64, the blades 58 are positioned on the first pipe 14 such that the excess portions 60 and 64 overlap one another. If the arcuate blades 58 do not include excess portions 60 and 64, the first and second tool pieces 50 and 54 are positioned on the first pipe 14 such that the first and second short edges 44 and 48 of a first arcuate blade 58 are adjacent to the first and second short edges 44 and 48 of the adjacent blade 58 or a small gap is defined therebetween. Whether the arcuate blades 58 are overlapping in part, positioned adjacent to one another, or defining a gap therebetween, the arcuate blades 58 are positioned on the first pipe 14 such that they will engage all the toothed metal segments 34 positioned between the first and second pipes 14 and 18. The first and second tool pieces 50 and 54 are thereafter slid toward the pipe joint 28 until the arcuate blades 58 are received between the flared end 26 of the second pipe 18 and the cylindrical end 22 of the first pipe 14.

Referring to FIG. 3, a tool such as a hammer (not shown) may be used to drive the driving member portion 62 towards the pipe joint 28 until the leading first short edges 52 of the arcuate blades 58 slides past the gasket 30 and disengage the gasket 30 from the outer surface 38 of the pipe 14. At the same time, the arcuate blades 58 disengage the toothed metal segments 34 from the outer surface of the first pipe 14. Moreover, with the first and second tool pieces 50 and 54 positioned on the first pipe 14 such that they will engage all the toothed metal segments 34, the arcuate blades 58 engage substantially the entire gasket 30 and do not leave any of the toothed metal segments 34 engaged with the outer surface 38 of the first pipe 14.

Referring to FIG. 4, with the toothed metal segments 34 no longer engaging and biting into the outer surface 38 of the first pipe 14, the cylindrical end 22 of the first pipe 14 can be removed from the flared end 26 of the second pipe 18 using suitable machinery well known in the art. As such, the first pipe 14 can be removed from the second pipe 18 in an easy, efficient manner without destroying any portions of the first or second pipes 14 and 18.

While illustrative embodiments have been illustrated and described, it will be appreciated that various changes can be made therein without departing from the spirit and scope of the present disclosure. It is therefore intended that the scope of the present disclosure be determined from the following claims and equivalents thereof.

The embodiments of the present disclosure in which an exclusive property or privilege is claimed are defined as follows:

1. A ductile iron pipe extracting tool for use with a first ductile iron pipe received within an open end of a second ductile iron pipe with a gasket disposed between the first and second ductile iron pipes, the first ductile iron pipe having an outer surface defining an outer circumference and the second ductile iron pipe having an inner surface defining an inner circumference, wherein the gasket has an annular elastomeric body with a circumference sized to be disposed between the first and second ductile iron pipes and a plurality of metal segments extending radially inward from the annular elastomeric body, each metal segment including a plurality of teeth angled away from the open end of the second ductile iron pipe that are engageable with an exterior surface of the first ductile iron pipe to prevent the first ductile iron pipe from being pulled axially outward from within the second ductile iron pipe, the ductile iron pipe extracting tool comprising:
    (a) an arcuate blade having a circumferential length extending between first and second unbroken, continuous, straight edges and an axial length extending between third and fourth unbroken, continuous, straight edges, wherein the third and fourth unbroken, continuous, straight edges are substantially transverse to the first and second unbroken, continuous, straight edges, and wherein the arcuate blade comprises a material that extends continuously between the first, second, third, and fourth edges, the arcuate blade being sized and shaped to completely surround the outer circumference of the first ductile iron pipe and slide between the outer surface of the first ductile iron pipe and the inner surface of the second ductile iron pipe to disengage the teeth of the gasket from the outer surface of the first ductile iron pipe, the arcuate blade having a circumferential length to define first and second excess portions on the first and second ends of the arcuate blade that overlap when the arcuate blade surrounds the outer circumference of the first ductile iron pipe and the arcuate blade is slid between the outer surface of the first ductile iron pipe and the inner surface of the second ductile iron pipe; and
    (b) a driving member portion extending radially outward from the arcuate blade, the driving member portion having an inner circumferential length less than the circumferential length of the arcuate blade to define the first and second excess portions of the first arcuate blade.

2. A ductile iron pipe extracting tool kit for use with a first ductile iron pipe having an outer surface defining an outer circumference and a second ductile iron pipe having an inner surface defining an inner circumference, the first ductile iron pipe received within an open end of the second ductile iron pipe with a gasket disposed between the first and second ductile iron pipes, wherein the gasket has an annular elastomeric body with a circumference sized to be disposed between the first and second ductile iron pipes and a plurality of metal segments extending radially inward from the annular elastomeric body, each metal segment including a plurality of teeth angled away from the open end of the second ductile iron pipe that are engageable with the outer surface of the first ductile iron pipe to prevent the first ductile iron pipe from being pulled axially outward from within the second ductile iron pipe, the ductile iron pipe extracting tool kit comprising:
    (a) a first tool piece, comprising:
        (i) a first arcuate blade having a circumferential length extending between first and second unbroken, continuous, straight edges and an axial length extending between third and fourth unbroken, continuous, straight edges, wherein the third and fourth unbroken, continuous, straight edges are substantially transverse to the first and second unbroken, continuous, straight edges, and wherein the arcuate blade comprises a material that extends continuously between the first, second, third, and fourth edges, the first arcuate blade having a shape and circumferential length to surround a first portion of the first ductile iron pipe and slide between the outer surface of the first ductile iron pipe and the inner circumference of the second ductile iron pipe to disengage the teeth of a first portion of the gasket from the outer surface of the first ductile iron pipe, the first arcuate blade having a circumferential length to define first and second excess portions on the first and second ends of the first arcuate blade;
        (ii) a first driving member portion extending radially outward from the first arcuate blade, the first driving member portion having an inner circumferential length less than the circumferential length of the first arcuate blade to define the first and second excess portions of the first arcuate blade;
    (b) a second tool piece, comprising:
        (i) a second arcuate blade having a circumferential length extending between first and second unbroken, continuous, straight edges and an axial length extending between third and fourth unbroken, continuous, straight edges, wherein the third and fourth unbroken, continuous, straight edges are substantially transverse to the first and second unbroken, continuous, straight edges, and wherein the second arcuate blade comprises a material that extends continuously between the first, second, third, and fourth edges, the second arcuate blade having a shape and circumferential length to surround a second portion of the first ductile iron pipe and slide between the outer surface of the first ductile iron pipe and the inner surface of the second ductile iron pipe to disengage the teeth of a second portion of the gasket from the outer surface of the first ductile iron pipe, the second arcuate blade having a circumferential length to define third and fourth excess portions on the first and second ends of the second arcuate blade that overlap the first and second excess portions of the first arcuate blade when the first and second arcuate blades surround the first ductile iron pipe and the first and second arcuate blades are slid between the outer surface of the first ductile iron pipe and the inner surface of the second ductile iron pipe; and (ii) a second driving member portion extending radially outward from the second arcuate blade, the second driving member having an inner circumferential length less than the circumferential length of the second arcuate blade to define the third and fourth excess portions of the second arcuate blade.

3. A method for disengaging a first ductile iron pipe received within an open end of a second ductile iron pipe the method comprising:

(a) providing a first ductile iron pipe received within an open end of a second ductile iron pipe with a gasket disposed between the first and second ductile iron pipes, the first ductile iron pipe having an outer surface defining an outer circumference and the second ductile iron pipe having an inner surface defining an inner circumference, wherein the gasket has an annular elastomeric body with a circumference sized to be disposed between the first and second ductile iron pipes and a plurality of metal segments extending radially inward from the annular elastomeric body, each metal segment including a plurality of teeth angled away from the open end of the second ductile iron pipe that are engageable with the outer surface of the first ductile iron pipe to prevent the first ductile iron pipe from being pulled axially outward from within the second ductile iron pipe;

(b) providing a ductile iron pipe extracting tool having first and second tool pieces, each tool piece comprising:

(i) an arcuate blade having first and second unbroken, continuous, straight edges and third and fourth unbroken, continuous, straight edges that are substantially transverse to the first and second unbroken, continuous, straight edges, the arcuate blade comprising a material that extends continuously between the first, second, third, and fourth edges, the arcuate blade having a shape and circumferential length to surround a portion of the first ductile iron pipe and slide between the outer surface of the first ductile iron pipe and the inner surface of the second ductile iron pipe to disengage a portion of the teeth of the gasket from the outer surface of the first ductile iron pipe, the arcuate blade having a circumferential length to define first and second excess portions on the first and second ends of the arcuate blade;

(ii) a driving member portion extending radially outward from the arcuate blade, the driving member portion extending axially along a portion of the arcuate blade to define a driving member thickness substantially greater than the thickness of the arcuate blade, the driving member having an inner circumferential length less than a circumferential length of the arcuate blade to define the first and second excess portions of the arcuate blade;

(b) engaging the arcuate blade of the first tool piece with the outer surface of a first portion of the first ductile iron pipe;

(c) engaging the arcuate blade of the second tool piece with the outer surface of a second portion of the first ductile iron pipe such that the first and second excess portions of the second tool piece overlap the first and second excess portions of the first tool piece;

(d) applying a force against the driving member portions of the first and second tool pieces to drive the arcuate blade of the first and second tool pieces between the first and second ductile iron pipes to disengage the teeth of the gasket from the outer surface of the first ductile iron pipe; and (e) pulling the first ductile iron pipe axially outward until the first ductile iron pipe is no longer received within the second ductile iron pipe.

4. A ductile iron pipe extracting tool for use with a first ductile iron pipe received within an open end of a second ductile iron pipe with a gasket disposed between the first and second ductile iron pipes, the first ductile iron pipe having an outer surface defining an outer circumference and the second ductile iron pipe having an inner surface defining an inner circumference, wherein the gasket has an annular elastomeric body with a circumference sized to be disposed between the first and second ductile iron pipes and a plurality of metal segments extending radially inward from the annular elastomeric body, each metal segment including a plurality of teeth angled away from the open end of the second ductile iron pipe that are engageable with the outer surface of the first ductile iron pipe to prevent the first ductile iron pipe from being pulled axially outward from within the second ductile iron pipe, the ductile iron pipe extracting tool comprising:

(a) an arcuate blade having a circumferential length extending between first and second unbroken, continuous, straight edges and an axial length extending between third and fourth unbroken, continuous, straight edges, wherein the third and fourth unbroken, continuous, straight edges are substantially transverse to the first and second unbroken, continuous, straight edges, and wherein the arcuate blade comprises a material that extends continuously between the first, second, third, and fourth edges, the arcuate blade being sized and shaped to completely surround the outer circumference of the first ductile iron pipe and slide between the outer surface of the first ductile iron pipe and the inner surface of the second ductile iron pipe to disengage the teeth of the gasket from the outer surface of the first ductile iron pipe; and (b) a driving member portion extending radially outward from the arcuate blade.

5. A ductile iron pipe extracting tool kit for use with a first ductile iron pipe having an outer surface defining an outer circumference and a second ductile iron pipe having an inner surface defining an inner circumference, the first ductile iron pipe received within an open end of the second ductile iron pipe with a gasket disposed between the outer surface of the first ductile iron pipe and the inner surface of the second ductile iron pipe, wherein the gasket has an annular elastomeric body with a circumference sized to be disposed between the first and second ductile iron pipes and a plurality of metal segments extending radially inward from the annular elastomeric body, each metal segment including a plurality of teeth angled away from the open end of the second ductile iron pipe that are engageable with the outer surface of the first ductile iron pipe to prevent the first ductile iron pipe from being pulled axially outward from within the second ductile iron pipe, the ductile iron pipe extracting tool kit comprising:

(a) a first tool piece, comprising:
  (i) a first arcuate blade having a circumferential length extending between first and second unbroken, continuous, straight edges and an axial length extending between third and fourth unbroken, continuous, straight edges, wherein the third and fourth unbroken, continuous, straight edges are substantially transverse to the first and second unbroken, continuous, straight edges, and wherein the arcuate blade comprises a material that extends continuously between the first, second, third, and fourth edges, the first arcuate blade having a shape and circumferential length to surround a first portion of the outer circumference of the first ductile iron pipe and slide between the outer surface of the first ductile iron pipe and the inner surface of the second ductile iron pipe to disengage the teeth of a first portion of the gasket from the outer surface of the first ductile iron pipe;
  (ii) a first driving member portion extending radially outward from the first arcuate blade;

(b) a second tool piece, comprising:
  (i) a second arcuate blade having a circumferential length extending between first and second unbroken, continuous, straight edges and an axial length extending between third and fourth unbroken, continuous, straight edges, wherein the third and fourth unbroken, continuous, straight edges are substantially transverse to the first and second unbroken, continuous, straight edges, and wherein the second arcuate blade comprises a material that extends continuously between the first, second, third, and fourth edges, the second arcuate blade having a shape and circumferential length to surround a second portion of the first ductile iron pipe and slide between the outer surface of the first ductile iron pipe and the inner surface of the second ductile iron pipe to disengage the teeth of a second portion of the gasket from the outer surface of the first ductile iron pipe; and
  (ii) a second driving member portion extending radially outward from the second arcuate blade.

6. A method for disengaging a first ductile iron pipe received within an open end of a second ductile iron pipe, the method comprising:

(a) providing a first ductile iron pipe received within an open end of a second ductile iron pipe with a gasket disposed between the first and second ductile iron pipes, the first ductile iron pipe having an outer surface defining an outer circumference and the second ductile iron pipe having an inner surface defining an inner circumference, wherein the gasket has an annular elastomeric body with a circumference sized to be disposed between the first and second ductile iron pipes and a plurality of metal segments extending radially inward from the annular elastomeric body, each metal segment including a plurality of teeth angled away from the open end of the second ductile iron pipe that are engageable with the outer surface of the first ductile iron pipe to prevent the first ductile iron pipe from being pulled axially outward from within the second ductile iron pipe;

(b) providing a ductile iron pipe extracting tool having first and second tool pieces, each tool piece comprising:
  (i) an arcuate blade having first and second unbroken, continuous, straight edges and third and fourth unbroken, continuous, straight edges that are substantially transverse to the first and second unbroken, continuous, straight edges, the arcuate blade comprising a material that extends continuously between the first, second, third, and fourth edges, the arcuate blade having a shape and circumferential length to surround a portion of the first ductile iron pipe and slide between the outer surface of the first ductile iron pipe and the inner surface of the second ductile iron pipe to disengage all the teeth of a portion of the gasket having substantially the same circumferential length as the arcuate blade from the outer surface of the first ductile iron pipe;
  (ii) a driving member portion extending radially outward from the arcuate blade, the driving member portion extending axially along a portion of the arcuate blade to define a driving member thickness substantially greater than the thickness of the arcuate blade;

(c) engaging the arcuate blade of the first tool piece with a first portion of the outer surface of the first ductile iron pipe;

(d) engaging the arcuate blade of the second tool piece with a second portion of the outer surface of the exterior of the first ductile iron pipe;

(e) applying a force against the driving member portion of the first and second tool pieces to drive the arcuate blade of the first and second tool pieces between the first and second ductile iron pipes to disengage the teeth of the gasket from the outer surface of the first ductile iron pipe; and (f) pulling the first ductile iron pipe axially outward until the first ductile iron pipe is no longer received within the second ductile iron pipe.

\* \* \* \* \*